July 13, 1954   G. A. LYON   2,683,631
WHEEL COVER
Filed March 11, 1952   2 Sheets-Sheet 1
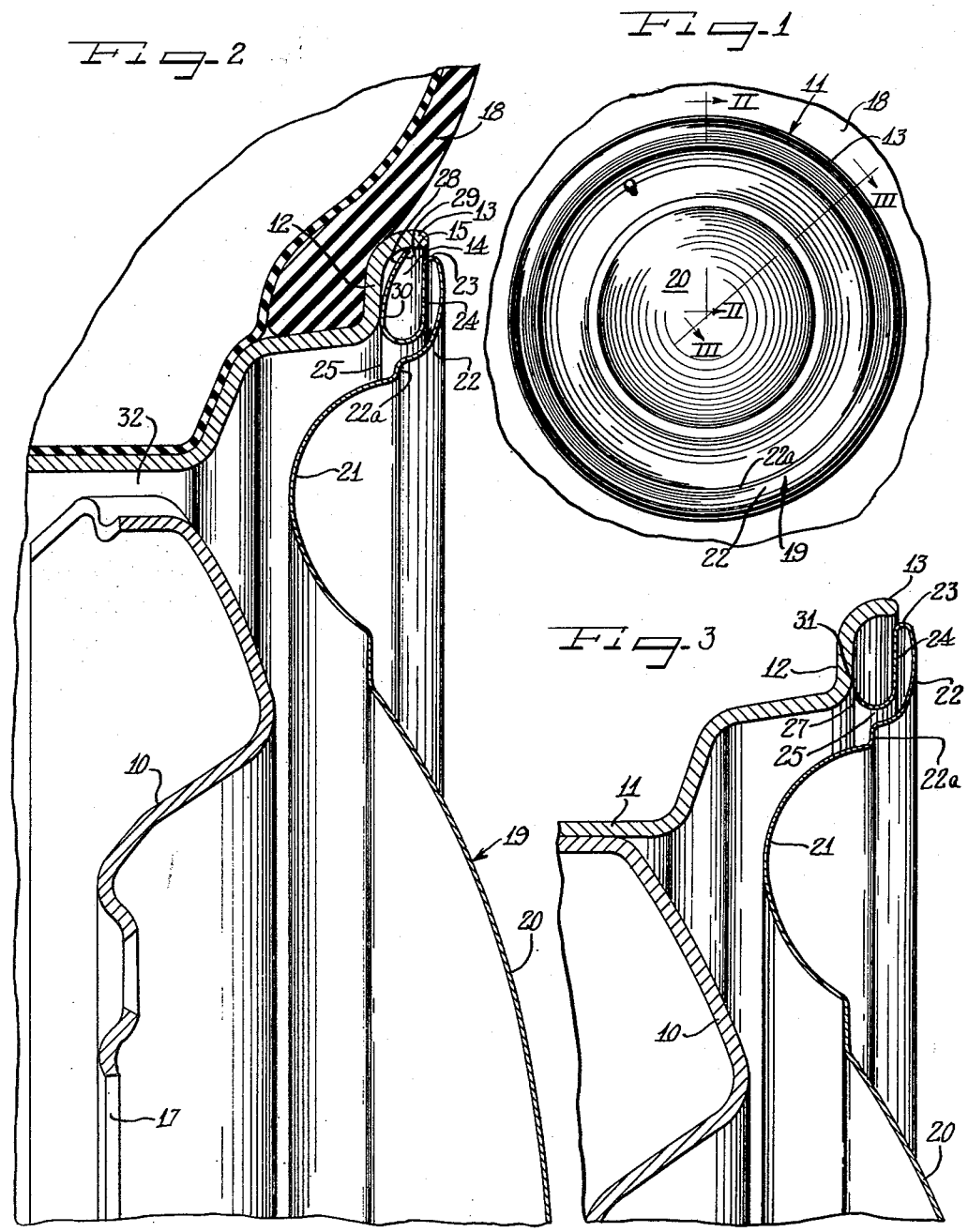
Inventor
George Albert Lyon July 13, 1954                G. A. LYON                2,683,631
                             WHEEL COVER
Filed March 11, 1952                          2 Sheets-Sheet 2
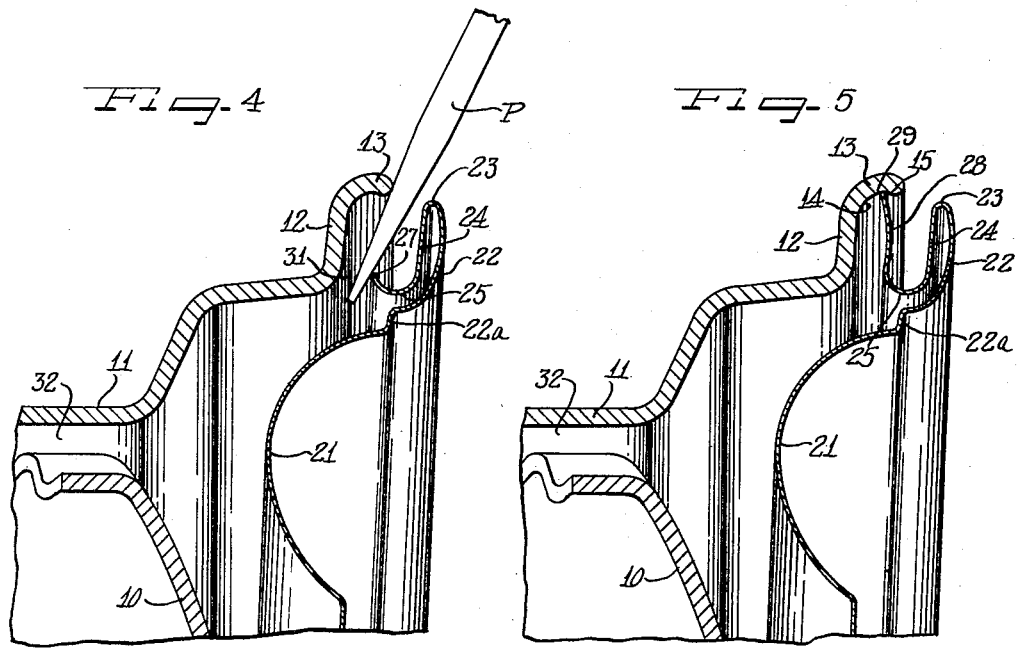
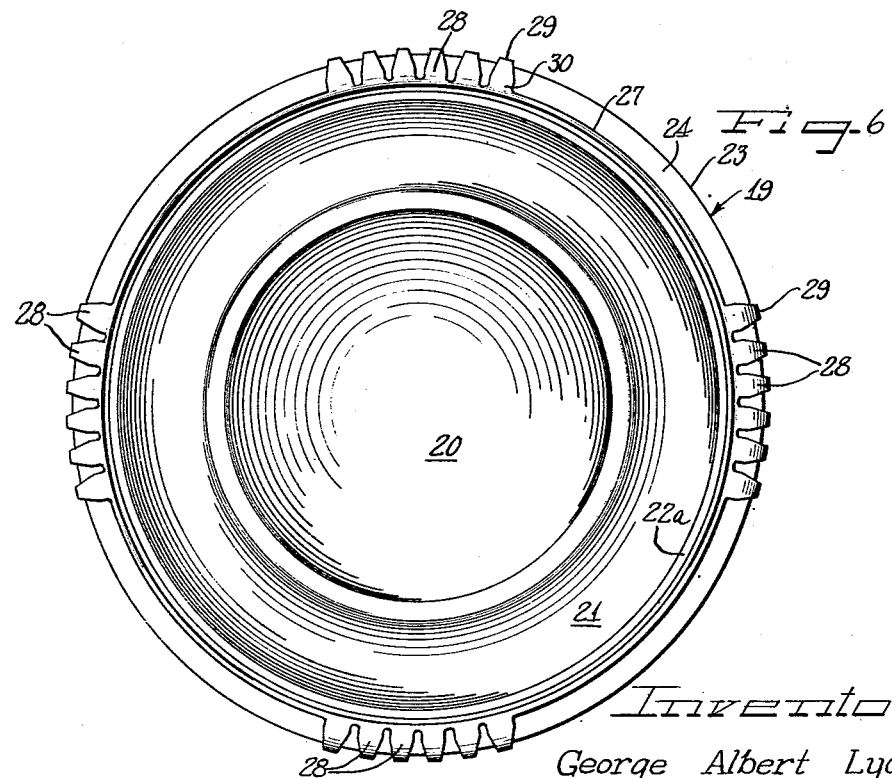
Inventor
George Albert Lyon Patented July 13, 1954

2,683,631

UNITED STATES PATENT OFFICE 2,683,631

WHEEL COVER

George Albert Lyon, Detroit, Mich.

Application March 11, 1952, Serial No. 275,872

1 Claim. (Cl. 301—37)

The present invention relates to improvements in wheel structures and more particularly concerns the covering of the outer sides of vehicle wheels such as automobile wheels. The present subject matter constitutes a modification and improvement of that shown in my United States Letters Patent No. 2,624,634 issued January 6, 1953 from my co-pending application filed April 27, 1951.

An important object of the present invention is to provide for the improved ornamental and protective covering of the outer side of vehicle wheels.

Another object of the invention is to provide an improved vehicle wheel and ornamental cover therefor and novel means for retaining the cover on the wheel.

A further object of the invention is to provide an improved ornamental and protective wheel cover for the outer side of vehicle wheels having improved means for self-retention of the cover on the wheel.

Still another object of the invention is to provide in a vehicle wheel cover improved retaining finger and flange structure at the margin of the cover for self-retention of the cover on a vehicle wheel by engagement with the terminal flange of the tire rim of the wheel.

According to the general features of the invention there is provided in a wheel structure including a tire rim having a terminal flange, a cover comprising a circular cover body having a marginal cover retaining structure including a flange of curved cross-section provided with finger extensions from a generally radially outwardly extending underturned portion of the flange, the fingers being retainingly engageable with the terminal flange of the tire rim.

According to other features of the invention there is provided in a cover for disposition at the outer side of a vehicle wheel including a tire rim having a terminal flange structure, a circular cover body having a margin generally dimensioned to lie adjacent to a tire rim terminal flange, said marginal structure comprising a continuous annular flange including a portion extending generally radially inwardly and a portion curved generally axially inwardly and then radially outwardly behind said radially inwardly extending portion, having generally radially outwardly extending finger extensions for retaining engagement with the tire rim terminal flange.

Other objects, features and advantages of the present invention will be readily apparent from the following detailed description of a preferred embodiment thereof taken in conjunction with the accompanying drawing in which;

Figure 1 is a side elevational view of a vehicle wheel and the cover mounted thereon and embodying features of the present invention;

Figure 2 is an enlarged fragmentary radial sectional view taken substantially on the line II—II of Figure 1;

Figure 3 is a fragmentary radial sectional view taken substantially on the line III—III of Figure 1;

Figure 4 is a radial sectional view similar to Figure 3 but showing the cover in process of being pried from the wheel;

Figure 5 is a radial sectional view similar to Figure 2 showing the cover in process of being pried from the wheel; and Figure 6 is a rear elevational view of the cover as it appears when free from the wheel.

As shown on the drawings:

A vehicle wheel for which the present invention is adapted comprises a wheel body 10 appropriately secured to a tire rim 11. The tire rim is of the usual multi-flanged drop center type including a terminal flange structure comprising a generally radially outwardly extending portion 12 and a generally axially outwardly extending curved portion 13 defining a generally radially inwardly opening annular groove 14. The groove 14 is defined at its axially outer side by a generally radially and axially inwardly directed shoulder 15.

The wheel body 10 is provided with the usual dished central bolt-on flange structure 17 by which the wheel is attached to a vehicle axle part such as the brake drum usually associated with automobile axles.

The tire rim is adapted to support a pneumatic tire and tube assembly 18.

For disposition at the outer side of the wheel in protective and ornamental relation there is herein provided a wheel cover 19 which is preferably of the full disk type and of a magnitude and extent to cover the outer side of not only the wheel body but also substantially all of the tire rim. The cover is adapted to be made from an appropriate gauge sheet metal such as a suitable grade of stainless steel and may be suitably finished as for example by polishing the outer surface thereof to a high polish, to which stainless steel is especially susceptible.

In the present instance, the cover comprises a crowned central portion 20 merging with an annular transversely dished portion 21 affording a large axially outwardly opening groove generally simulating the groove defined between the wheel body and the tire rim. At its outer margin the cover is provided with a preferably generally convex annular marginal formation 22 joined to the dished portion 21 by a rigidifying annular juncture indentation 22a providing a reinforcing double annular rib structure, the ribs being of small radius, while the marginal portion 22 provides a large radius convex rib thus affording a substantial structural rigidity at the margin of the cover.

Further strengthening the marginal structure 22 of the cover is a marginal terminal generally bead-like underturned extremity 23 affording a rib or bead of small radius at the marginal extremity of the cover and of a diameter which is preferably slightly less than the inner diameter defined by the outer edge portion of the extremity flange 13 of the tire rim. This also provides a smooth edge finish for the cover.

According to the present invention the marginal structure 22, 23 of the cover carries means for effectively retaining the cover on the wheel by interengagement with the terminal flange structure of the tire rim. To this end, the turned marginal extremity 23 is preferably provided with an underturned generally radially inwardly extending flange portion at the annular flange portion 24 lying in spaced relation back of the marginal portion 22. At its radially inner extremity, the underturned marginal flange 24 is provided with a generally axially inwardly extending curved annular continuous flange portion 25. This flange portion 25 is formed on a radius that is greater than the radius of the turned reinforcing terminal portion 23 and has a convex surface spaced radially outwardly from the reinforcing indentation 23. At its axially inner margin, the curved flange portion 25 has a generally radially outwardly extending annular continuous terminal portion 27 as best seen in Figures 3, 4 and 6. Through this construction, the curved flange 25 is of a high degree of resilience due to the smooth curvature thereof and the continuous, unbroken annular form thereof.

Means for actually retaining the cover on the wheel comprise a plurality of cover retaining flexible fingers 28. In the preferred arrangement, the fingers 28 are provided in a plurality of clusters, each cluster of fingers having a preferred number of the fingers such as six equally spaced and of identical form, and with the clusters of fingers spaced apart peripherally preferably equidistantly, there being four of the clusters as shown in Figure 6 in a practical instance. By having four clusters of the fingers 28, it is possible to manufacture the same economically in a square blank from which the cover is stamped by trimming the fingers out of the corner portions of the blank.

Each of the fingers 28 is formed on a smooth continuation of the curvature of the axially inner radially outwardly turned flange portion 27 but on a somewhat larger radius accommodated to the length of the finger which is sufficient to extend substantially radially outwardly beyond the diameter defined by the extremity curved portion 23 of the cover. Each of the fingers 28 extends to a terminal retaining edge 29 on a normal diameter which is at least slightly greater than the inside diameter of the largest diameter portion of the groove 14 in the tire rim terminal flange.

As best seen in Fig. 6, the fingers 28 extend radially and each of the fingers has the terminal edge 29 of substantial width from which the sides of the finger diverge to a substantially greater base width, with a base portion 30 of each finger at juncture with the flange portion 27 having the sides thereof preferably parallel.

In applying the cover to the wheel, the cover is placed substantially concentric with the wheel and with the terminal portions of the fingers 28 resting against the terminal edge of the terminal flange portion 13 of the tire rim. Axially inward pressure is then applied to the cover uniformly to cause the fingers 28 to cam flexibly past the tire rim terminal edge and snap in behind the shoulder 15 of the terminal flange within the groove 14. Since the fingers 28 are thereby stressed radially inwardly from their normal projecting extent, an effective wedging, retaining relationship is established between the tips 29 of the fingers and the terminal flange portion 13 of the tire rim. At the same time the stressed retaining fingers are caused to bottom at the base portions 30 thereof against the terminal flange portion 12 adjacent to the radially inner juncture thereof with the remainder of the tire rim. Stressing of the fingers and resilient tensioning thereof is enhanced by the longitudinal curvature of the fingers and by the smooth curvature juncture of the fingers with the curved flange portion 27 from which they project. In fact, through this construction, the highy resiliently resistant flange structure 25, 27 is placed under stress in the areas thereof contiguous the respective clusters of the fingers 28 to supplement the resilient stress of the fingers themselves and thus enhance the retaining, gripping, wedging engagement of the finger tips 29 with the tire rim flange.

It will be observed from Figure 2, that the radial dimensions of the flange 24 and the fingers 28 as well as the intervening contiguous flange structure 25, 27 is such as to be accommodated within the space afforded axially outwardly from the terminal flange portion 12 and radially inwardly from the terminal flange portion 13.

It will also be observed that by reason of the curvature of the base portions 30 of the retaining fingers, the edge of the flange portion 27 is maintained in the assembly of the cover with the wheel spaced from the adjacent portion of the tire rim so that an air space or gap 31 is afforded (Fig. 3) for circulation of air behind the cover past the edge of the cover at the turned portion 23 and through appropriate openings 32 afforded between the wheel body 10 and the base of the tire rim.

The cover 19 is adapted to be pried from the wheel when it is desired to gain access therebehind as for example for removing the wheel from the axle to which attached by way of bolts at the bolt-on flange 17. To this end, a pry-off tool (Fig. 4) can be inserted into the gap between the marginal structure of the cover and the tire rim and with the point of the tool engaging within the gap 31 between the inner turned flange portion 27 and the adjacent portion of the tire rim terminal flange 12 and leverage applied against the tip of the terminal flange portion 13 to pry the cover axially outwardly. As a result of the pry-off tool action, the retaining fingers 28 adjacent to the point of pry-off pressure are caused to bend flexibly by reason of the intense resilience of the fingers to turn in reverse from the normal curvature of the fingers until the tips 29 of the fingers can slide axially outwardly past the shoulder 15 and thus release the cover. Immediately upon passing the shoulder 15, the fingers snap back to their normal curvature which is generally radially and axially outwardly. During this pry-off, the curved flange structure 25, 27 affords resilient stress but does yield to afford adequate leverage clearance for turning over of the fingers as shown in Figure 5. Furthermore the resilience of the fingers and of the flange structure from which they extend enables a certain amount of movement of the cover resiliently diametrically away from the point of pry-off tool pressure to afford relief for the fingers that must turn out of the engaged relation in response to the pry-off tool force. In fact, the entirely resilient support of the cover by the retaining fingers only results in the cover being substantially universely floating within the resilient limits, of course, of the retaining fingers. The cover is resiliently cushioned against external pressures both inwardly and radially and quite thoroughly resists displacement from the wheel except in response to direct pry-off force by means of a pry-off tool in the manner depicted in Figures 4 and 5.

It may also be noted that by reason of the plurality of fingers in each of the groups or clusters of fingers, each of which has a fairly sharp cover retaining edge, the cover is effectively held against turning on the wheel during torque stresses encountered in service.

It should also be observed that by having the retaining fingers in rather widely separated clusters, pry-off of the cover is facilitated by the insertion of the pry-off tool P between adjacent groups of the fingers, and the flange portion 27, backed up by the curved flange portion 25 effectively resists damaging deformation from the pry-off tool force. The strongly reinforced marginal flange structure of the cover to which the flange portion 25 is connected by the flange 24 and the reinforcing turned cover extremity portion 23 also assures that the cover margin will not be deformed upon the application of pry-off force.

It will be understood that modifications and variations may be effected without departing from the scope of the novel concepts of the present invention.

I claim as my invention:

In a wheel structure including a wheel body and a multi-flange tire rim having a terminal flange of angular cross-section including a radially outwardly extending inner portion and a generally axially outwardly extending outer portion, a wheel cover for disposition at the outer side of the wheel including a tire rim covering marginal portion, the outer edge of said marginal portion being of a diameter to extend in adjacent spaced relation to said outer portion of the tire rim and having therebehind a flange structure extending generally radially and axially inwardly to a point adjacent to but spaced from the inner margin of the inner portion of the terminal flange, said flange structure having a generally radially outwardly turned continuous annular portion from which extend a plurality of circumferentially spaced groups of narrow generally radially and axially outwardly extending resiliently flexible retaining fingers spaced behind said flange structure to engage at their tips in biting relation against the outer portion of the terminal flange for retaining the cover on the wheel, said fingers having axially inwardly bowed junctures with the edge of said flange portion and providing shoulders for cushioned engagement against the inner portion of the terminal flange while the tips of the fingers engage retainingly and under biting resilient thrust against the inner face of the outer portion of the terminal flange, said cover flange portion providing a shoulder engageable by a pry-off tool.

References Cited in the file of this patent

UNITED STATES PATENTS

| Number | Name | Date |
| --- | --- | --- |
| 2,368,228 | Lyon | Jan. 30, 1945 |
| 2,404,390 | Lyon | July 23, 1946 |
| 2,433,854 | Lyon | Jan. 6, 1948 |